(12) United States Patent
Harris et al.

(10) Patent No.: US 12,725,468 B2
(45) Date of Patent: Sep. 1, 2026

(54) TECHNOLOGY FOR CAPTURING AND ANALYZING SENSOR DATA TO DYNAMICALLY FACILITATE VEHICLE OPERATION FEEDBACK

(71) Applicant: QUANATA, LLC, San Francisco, CA (US)

(72) Inventors: Steven J. Harris, Saratoga, CA (US); Kenneth J. Sanchez, San Francisco, CA (US); Eric Dahl, Newman Lake, WA (US)

(73) Assignee: QUANATA, LLC, San Francisco, CA (US)

( * ) Notice: Subject to any disclaimer, the term of this patent is extended or adjusted under 35 U.S.C. 154(b) by 15 days.

(21) Appl. No.: 18/594,891

(22) Filed: Mar. 4, 2024

(65) Prior Publication Data

US 2024/0203176 A1 Jun. 20, 2024

Related U.S. Application Data

(63) Continuation of application No. 17/090,554, filed on Nov. 5, 2020, now Pat. No. 11,922,739, which is a (Continued)

(51) Int. Cl.

*G07C 5/08* (2006.01)
*G07C 5/00* (2006.01)

(Continued)

(52) U.S. Cl.

CPC ........... *G07C 5/0808* (2013.01); *G07C 5/008* (2013.01); *G07C 5/0825* (2013.01); *G01C 21/00* (2013.01);

(Continued)

(58) Field of Classification Search

CPC .... G07C 5/0808; G07C 5/008; G07C 5/0825; G07C 5/0841; G01C 21/00; G01C 21/26;

(Continued)

(56) References Cited

U.S. PATENT DOCUMENTS

| | | | | |
|---|---|---|---|---|
| 8,140,358 | B1 | 3/2012 | Ling et al. | |
| 8,536,994 | B2 * | 9/2013 | Hada ..................... | B60Q 9/008 340/471 |

(Continued)

*Primary Examiner* — Behrang Badii
(74) *Attorney, Agent, or Firm* — BRYAN CAVE LEIGHTON PAISNER LLP

(57) ABSTRACT

A system comprising one or more processors and one or more non-transitory computer-readable media storing computing instructions that, when executed on the one or more processors, cause the one or more processors to perform operations: comparing, by an electronic device, at least one parameter of a set of telematics data associated with a vehicle and at least one additional parameter of an additional set of telematics data associated with one or more other vehicles within a threshold distance of the vehicle to determine a difference between the at least one parameter and the at least one additional parameter; and displaying, by the electronic device, the difference to the operator of the vehicle to notify the operator of the vehicle about the difference. Other embodiments are described.

20 Claims, 5 Drawing Sheets

Related U.S. Application Data continuation of application No. 15/874,431, filed on Jan. 18, 2018, now Pat. No. 10,861,257.

(60) Provisional application No. 62/447,754, filed on Jan. 18, 2017.

(51) Int. Cl.
*G01C 21/00* (2006.01)
*G01C 21/26* (2006.01)
*G06G 7/78* (2006.01)
*G08G 1/0967* (2006.01)

(52) U.S. Cl.
CPC ............... *G01C 21/26* (2013.01); *G06G 7/78* (2013.01); *G08G 1/096741* (2013.01)

(58) Field of Classification Search
CPC ................. G01C 21/3697; G06G 7/78; G08G 1/096741; G08G 1/0112; G08G 1/0129; G08G 1/0141; G08G 1/0962; G08G 1/096775
See application file for complete search history.

(56) References Cited

U.S. PATENT DOCUMENTS 9,189,450 B2 11/2015 Raghunathan et al.
9,805,601 B1 10/2017 Fields et al.
10,427,496 B2 10/2019 Connell et al.
2005/0222751 A1* 10/2005 Uyeki .............. G08G 1/096827 340/995.13
2009/0091435 A1 4/2009 Bolourchi
2009/0292413 A1* 11/2009 Kubotani ............ B60R 16/0231 701/96
2010/0063725 A1 3/2010 Miura et al.
2010/0324775 A1* 12/2010 Kermani .......... G08G 1/096783 701/1
2013/0079970 A1 3/2013 Raghunathan et al.
2013/0162791 A1 6/2013 Chen et al.
2013/0336094 A1 12/2013 Gruteser et al.
2016/0001781 A1 1/2016 Fung et al.
2016/0031479 A1 2/2016 Fung et al.
2017/0057543 A1 3/2017 Sakaguchi et al.
2017/0221362 A1* 8/2017 Gunaratne ............. G08G 1/166
2017/0246987 A1* 8/2017 Liljestrand ............... B60Q 1/54
2017/0365169 A1* 12/2017 Tennent ................. G06Q 10/06
2018/0022187 A1 1/2018 Connell et al.
2018/0052458 A1 2/2018 Tsuji et al.
2018/0060020 A1 3/2018 Dogrultan
2018/0144636 A1* 5/2018 Becker ................... G08G 1/166
2019/0310091 A1 10/2019 Maeda et al.
2025/0304078 A1* 10/2025 Slusar ................... B60W 40/09

* cited by examiner

TECHNOLOGY FOR CAPTURING AND ANALYZING SENSOR DATA TO DYNAMICALLY FACILITATE VEHICLE OPERATION FEEDBACK

CROSS-REFERENCE TO RELATED APPLICATIONS

This application is a continuation of U.S. application Ser. No. 17/090,554, filed on Nov. 5, 2020, to be issued as U.S. Pat. No. 11,922,739, which is a continuation of U.S. patent application Ser. No. 15/874,431, filed on Jan. 18, 2018, issued as U.S. Pat. No. 10,861,257, which claims the benefit of U.S. Patent Application No. 62/447,754, filed Jan. 18, 2017, each of which is hereby incorporated by reference in their entirety.

TECHNICAL FIELD

The present disclosure is directed to accumulating and analyzing sensor data to dynamically facilitate vehicle operation feedback. More particularly, the present disclosure is directed to systems and methods for comparing telematics data associated with a vehicle to telematics data associated with additional vehicles to dynamically assess operation of the vehicle relative to that of the additional vehicles.

BACKGROUND

Individuals have been operating vehicles as a means of transportation for decades. Recently, vehicles have been equipped with certain computing components and devices. As vehicles incorporate more sensors, devices, and communication capabilities, it is increasingly easier to collect and assess telematics data for certain purposes. For example, an administrator of a fleet operator may use certain telematics data to track and assess individual vehicle operators.

While vehicle operators control operation of their respective vehicles, there are certain laws and regulations in place that effectually limit or influence certain driving behaviors. For example, most roadways have an associated speed limit. Additionally, certain unforeseen or scheduled conditions may impact collective vehicle operation. For example, traffic jams, construction, accidents, and weather may each impact vehicle speed, braking, and acceleration. However, it is not always the case that vehicle operators comply with the laws and regulations, either out of necessity or personal choice. For example, although a speed limit on a certain roadway may be 55 mph, the general flow of traffic may average 65 mph.

Accordingly, there is an opportunity to leverage certain sensor and telematics data to determine and assess operation of a specific vehicle in relation to the operation of nearby additional vehicles as well as certain location conditions.

SUMMARY

A computer-implemented method in an electronic device of dynamically assessing vehicle operation is provided. The method may include accumulating a set of telematics data associated with operation of a vehicle, the set of telematics data including at least a location of the vehicle, accessing an additional set of telematics data associated with operation of an additional set of vehicles within a threshold distance of the location of the vehicle, analyzing the set of telematics data and the additional set of telematics data, including: comparing at least one parameter of the set of telematics data to at least one corresponding parameter of the additional set of telematics data, and based on the comparing, calculating a degree of deviation between the at least one parameter and the at least one corresponding parameter, and displaying, via a user interface of the electronic device, an indication of the degree of deviation.

In another embodiment, a system in a vehicle for dynamically assessing vehicle operation is provided. The system may include a user interface, a memory configured to store non-transitory computer executable instructions, and a processor interfacing with the user interface and the memory. The processor may be configured to execute the non-transitory computer executable instructions to cause the processor to accumulate a set of telematics data associated with operation of the vehicle, the set of telematics data including at least a location of the vehicle, access an additional set of telematics data associated with operation of an additional set of vehicles within a threshold distance of the location of the vehicle, analyze the set of telematics data and the additional set of telematics data, including: compare at least one parameter of the set of telematics data to at least one corresponding parameter of the additional set of telematics data, and based on the comparing, calculate a degree of deviation between the at least one parameter and the at least one corresponding parameter, and cause the user interface to display an indication of the degree of deviation.

Several embodiments can include a computer-implemented method for assessing vehicle operation. The method can include comparing, by an electronic device, at least one parameter of a set of telematics data associated with a vehicle and at least one additional parameter of an additional set of telematics data associated with one or more other vehicles within a threshold distance of the vehicle to determine a difference between the at least one parameter and the at least one additional parameter. The method also can include displaying, by the electronic device, the difference to the operator of the vehicle to notify the operator of the vehicle about the difference.

A number of embodiments can include a system including one or more processors and one or more non-transitory computer-readable media storing computing instructions that, when executed on the one or more processors, cause the one or more processors to perform certain acts. The acts can include comparing, by an electronic device, at least one parameter of a set of telematics data associated with a vehicle and at least one additional parameter of an additional set of telematics data associated with one or more other vehicles within a threshold distance of the vehicle to determine a difference between the at least one parameter and the at least one additional parameter. The acts also can include displaying, by the electronic device, the difference to the operator of the vehicle to notify the operator of the vehicle about the difference.

Various embodiments can include one or more non-transitory computer-readable media storing computing instructions that, when executed by one or more processors, cause the one or more processors to perform certain acts. The acts can include comparing, by an electronic device, at least one parameter of a set of telematics data associated with a vehicle and at least one additional parameter of an additional set of telematics data associated with one or more other vehicles within a threshold distance of the vehicle to determine a difference between the at least one parameter and the at least one additional parameter. The acts also can include displaying, by the electronic device, the difference to the operator of the vehicle to notify the operator of the vehicle about the difference.

Many embodiments can include a system of a means for comparing, by an electronic device, at least one parameter of a set of telematics data associated with a vehicle and at least one additional parameter of an additional set of telematics data associated with one or more other vehicles within a threshold distance of the vehicle to determine a difference between the at least one parameter and the at least one additional parameter. The system also can include a means for displaying, by the electronic device, the difference to the operator of the vehicle to notify the operator of the vehicle about the difference.

DETAILED DESCRIPTION

Figure 1:
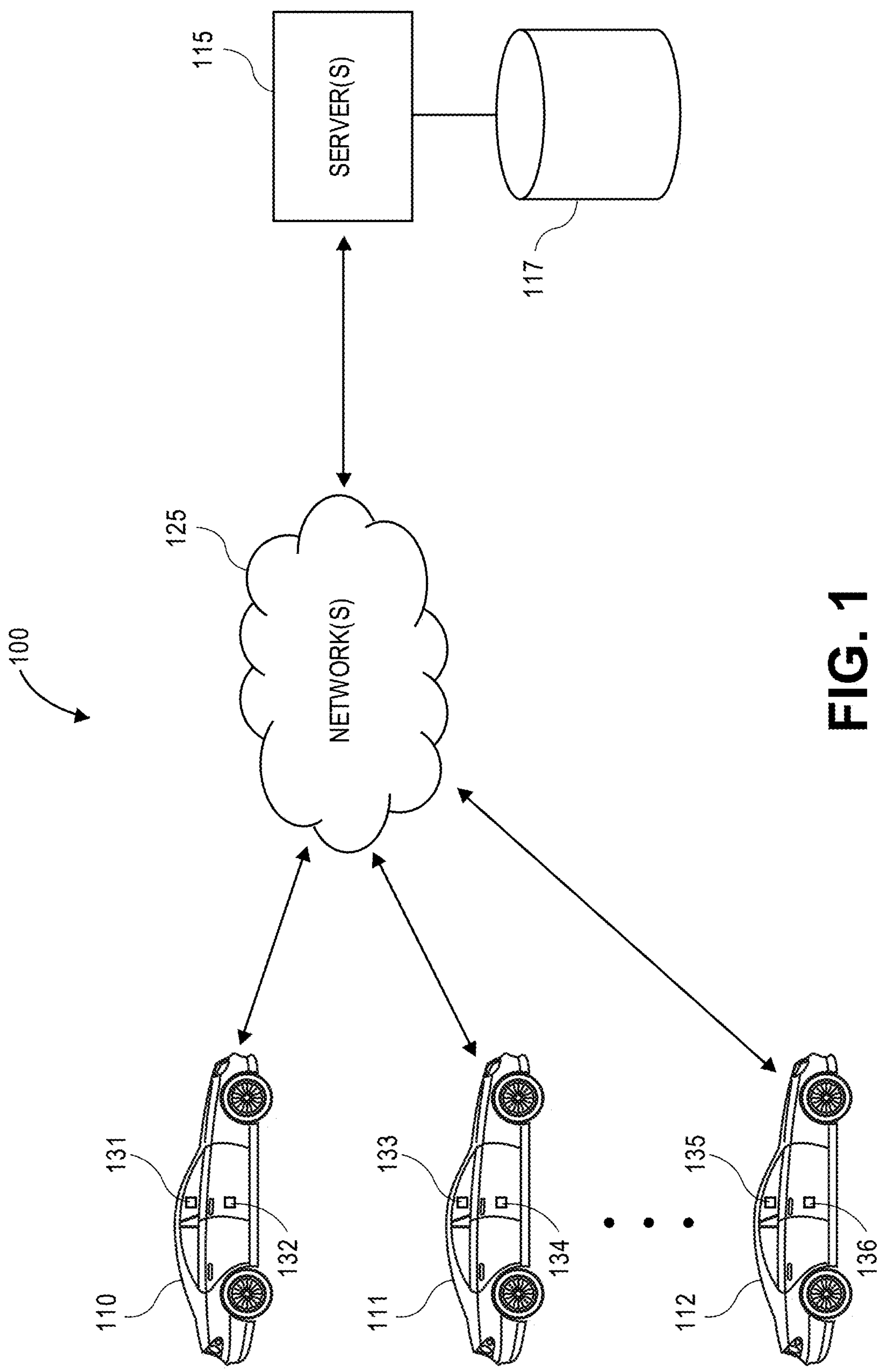
FIG. 1 depicts an exemplary diagram of the system and components thereof capable of facilitating the systems and methods, in accordance with some embodiments.

The present embodiments may relate to, inter alia, collecting and analyzing telematics data associated with vehicle operation. According to certain aspects, a backend computing device such as a server may dynamically collect, compile, and store telematics data associated with operation of a set of vehicles, where the telematics data may indicate a set of locations of the vehicles. Further, an electronic device may dynamically collect telematics data associated with operation of another vehicle, retrieve a relevant portion of the stored telematics data, and compare the collected telematics data to the retrieved telematics data. Additionally, the electronic device may generate and present data visualizations indicative of the telematics data comparison. In embodiments, the electronic device may account for certain rules and regulations associated with a particular location.

The systems and methods therefore offer numerous benefits. In particular, the systems and methods enable more accurate data analysis by accounting for actual, real-time or near-real-time telematics data of multiple vehicles. Additionally, the systems and methods generate real-time or near-real time visualizations indicative of vehicle operation, and present the visualizations for review by operators of the vehicles. In this regard, vehicle operators may assess their performance and operation relative to the performance and operation of other vehicle operators within a certain vicinity. It should be appreciated that additional benefits of the systems and methods are envisioned.

The systems and methods discussed herein address a challenge that is particular to assessing vehicle operation. In particular, the challenge relates to a difficulty in assessing the performance of vehicle operators relative to that of other vehicle operators. Conventional techniques compare performance of a vehicle operator to established laws or regulations, such as a speed limit. The systems and methods offer improved capabilities to address these shortcomings by accessing and analyzing data from multiple sources, including a set of sensors associated with individual vehicles as well as backend computing components that dynamically collect and store operation data associated with additional vehicles. Further, because the systems and methods employ the collection, analysis, and transmission of data associated with devices and vehicles, the systems and methods are necessarily rooted in computer technology in order to overcome the noted shortcomings that specifically arise in the realm of assessing vehicle operation.

Similarly, the systems and methods provide improvements in a technical field, namely, data compiling and analyzing. Instead of the systems and methods merely being performed by hardware components using basic functions, the systems and methods employ complex steps that go beyond the mere concept of simply retrieving and combining data using a computer. In particular, the hardware components capture vehicle telematics data, analyze the captured data by comparing to real-time or near-real-time telematics data associated with additional vehicles, and generate and display data visualizations indicative of the data analysis.

According to implementations, the systems and methods may support a dynamic, real-time or near-real-time analysis of any captured, received, and/or detected data. In particular, the electronic device may receive or capture telematics data in real-time or near real-time, may automatically and dynamically access additional telematics data in real-time or near-real-time, and may automatically and dynamically analyze the telematics data and the additional telematics data in real-time or near real-time. The electronic device may also automatically and dynamically generate and communicate relevant notifications and messages, and communicate with various backend servers. In this regard, the individuals are afforded the benefit of accurate and relevant data.

FIG. 1 illustrates an overview of a system 100 of components configured to facilitate the systems and methods. It should be appreciated that the system 100 is merely exemplary and that alternative or additional components are envisioned.

As illustrated in FIG. 1, the system 100 depicts a set of vehicles 110-112. Although FIG. 1 depicts three (3) vehicles 110-112, it should be appreciated that fewer or additional vehicles are envisioned. The vehicles 110-112 may be configured with a respective set of electronic devices 131-136. Each of the electronic devices 131-136 may be integrated within the vehicles 110-112 or may be separate from (but located within or in proximity to) the vehicles 110-112.

In some implementations, the electronic devices 132, 134, 136 may be included as part of an on-board diagnostic (OBD) system or any other type of system configured to be installed in the respective vehicle 110-112, such as an original equipment manufacturer (OEM) system. The electronic devices 132, 134, 136 may include a set of sensors configured to detect and record various telematics data associated with operation of the respective vehicles 110-112. In some implementations, the electronic device 110 may be configured to communicate with (i.e., request, retrieve, or receive data from) a set of sensors disposed in other locations of the respective vehicles 110-112.

Further, in some implementations, the electronic devices 131, 133, 135 may be any type of electronic device such as a mobile device. For example, the electronic devices 131, 133, 135 may be smartphones associated with respective operators of the respective vehicles 110-112. It should be appreciated that other types of electronic devices and/or mobile devices are envisioned, such as notebook computers, tablets, phablets, GPS (Global Positioning System) or GPSenabled devices, smart watches, smart glasses, smart bracelets, wearable electronics, PDAs (personal digital assistants), pagers, computing devices configured for wireless communication, and/or the like. The electronic devices 131, 133, 135 may be configured to communicate and interface with the respective electronic devices 132, 134, 136. Further, although not depicted in FIG. 1, the vehicle 100 and/or each of the electronic devices 131-136 may be equipped with storage or memory capable of storing various data.

According to embodiments, the set of sensors included in any or all of the electronic devices 131-136 or otherwise configured to communicate with any or all of the electronic devices 131-136 may be of various types. For example, the set of sensors may include at least one of: a location module (e.g., a global positioning system (GPS) chip), image sensor, accelerometer, gyrosensor, force sensor, strain gauge, inclinometer, goniometer, ignition sensor, clock, speedometer, torque sensor, throttle position sensor, gyroscope, compass, yaw rate sensor, tilt sensor, steering angle sensor, brake sensor, and/or other sensors. The set of sensors may also be configured to detect various conditions of the vehicle operators, including various biometric information, movements, and/or the like.

Each of the electronic devices 131-136 may be configured to communicate with at least one remote server 115 via one or more networks 125. It should be appreciated that various amounts of the remote server(s) 115 are envisioned. According to embodiments, the remote server(s) 115 may store data (i.e., may serve as a central repository) and/or exchange data with the electronic devices 131-136. For example, the remote server 115 may store data or information associated with a set of locations, and may provide the data or information to the electronic devices 131-136. The remote server 115 may also including logic or processing capabilities that may instruct the electronic devices 131-136 to perform certain actions. The network(s) 125 may support any type of data communication via any standard or technology (e.g., GSM, CDMA, TDMA, WCDMA, LTE, EDGE, OFDM, GPRS, EV-DO, UWB, Internet, IEEE 802 including Ethernet, WiMAX, Wi-Fi, Bluetooth, and others). The network(s) 125 may also be one or more private or local networks or dedicated frequency bands. The network(s) 125 may enable the electronic devices 131-136 and the remote server(s) 115 to communicate among each other in real-time or near-real time.

The remote server 115 may interface with a database 117 or other memory, which may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. According to embodiments, the database 117 may store various types of data received from the electronic devices 131-136 via the network(s) 125.

In a particular implementation, according to embodiments, one or more of the electronic devices 131-134 associated with the vehicles 110, 111 may accumulate or record telematics data during operation of the vehicles 110, 111, and transmit the telematics data, via the network(s) 125, to the server(s) 115 for storage on the server(s) 115. The telematics data may indicate respective locations of the vehicles 110, 111 (i.e., the locations of the vehicles 110, 111 when the telematics data was accumulated or recorded).

Additionally, either of the electronic devices 135, 136 associated with the vehicle 112 may similarly accumulate or record telematics data during operation of the vehicle 112, where the telematics data may indicate a location of the vehicle 112. Either of the electronic devices 135, 136 may retrieve, from the server(s) 115, a portion of the stored telematics data of the vehicles 110, 111 that may correspond to the accumulated telematics data of the vehicle 112. Additionally, either of the electronic devices 135, 136 may analyze the accumulated telematics data and the retrieved telematics data, and generate and present various visualizations to an operator of or other individual who may be traveling in the vehicle 112. Accordingly, the operator or other individual may dynamically review and assess the operation of the vehicle 112 relative to the operation of the other vehicles 110, 111. These functionalities are described in further detail with respect to FIG. 2.

Figure 2:
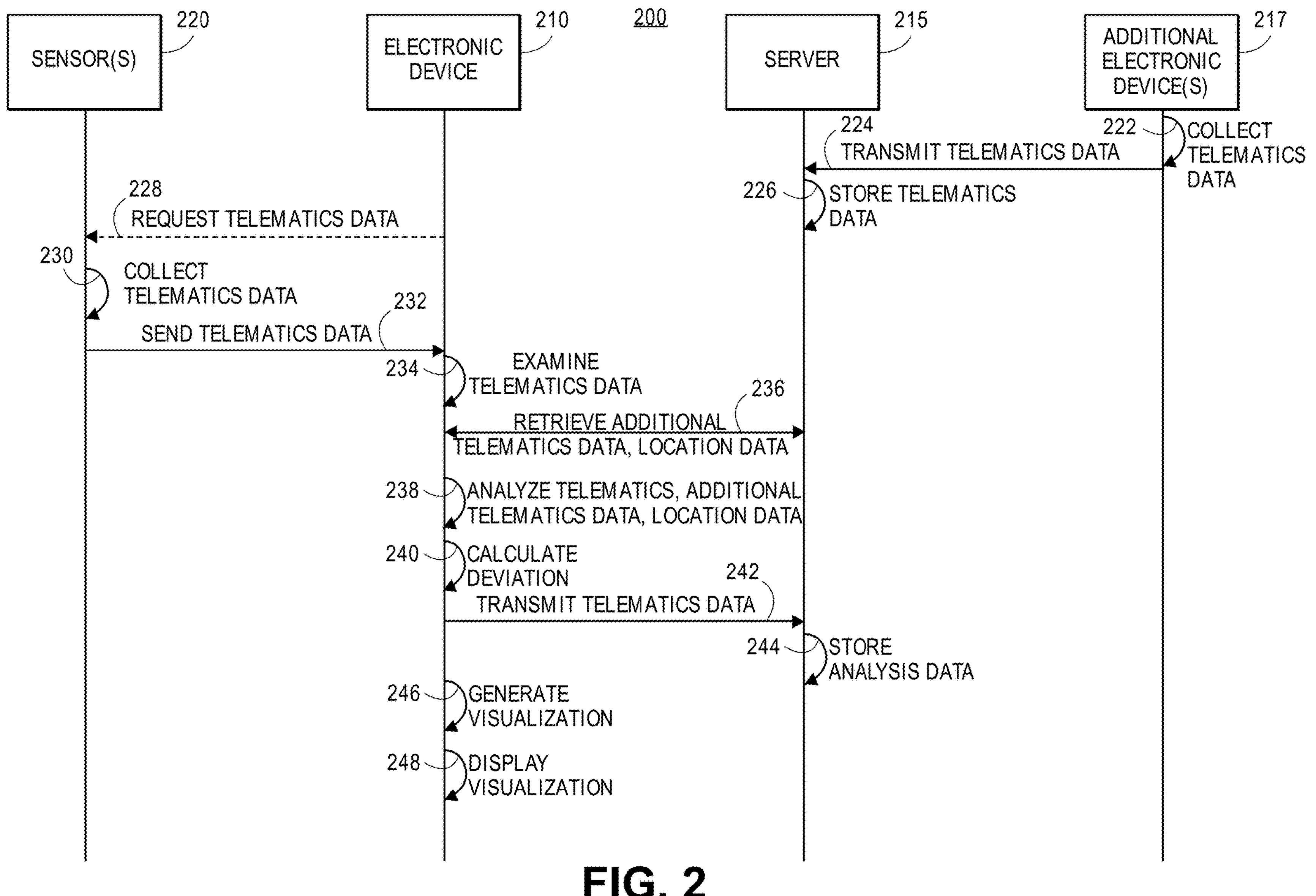
FIG. 2 depicts an exemplary signal diagram associated with accumulating sensor data to dynamically assess vehicle operation, in accordance with some embodiments.

FIG. 2 depicts a signal diagram 200 associated with facilitating certain functionalities associated with the systems and methods. The signal diagram 200 includes a set of sensors 220, an electronic device 210 (such as one of the electronic devices 131-136 as discussed with respect to FIG. 1), at least one server 215 (such as the server(s) 115 as discussed with respect to FIG. 1), and a set of additional electronic devices 217 (such as one of the electronic devices 131-136 as discussed with respect to FIG. 1). It should be appreciated that additional or alternative components and devices are envisioned.

According to embodiments, each of the electronic device 210 and the additional electronic device(s) 217 may be associated with a respective vehicle. In an implementation, at least a portion of the set of sensors 220 may be included as part of (or separate from) the electronic device 210. Further, the set of additional electronic devices 217 may have a set of sensors incorporated therein and/or may interface with a set of external sensors. Generally, the sensors 220 and the sensors associated with the set of additional electronic devices 217 may include any of a location module (e.g., a GPS chip), an image sensor, an accelerometer, a gyrosensor, a force sensor, a strain gauge, an inclinometer, a goniometer, an ignition sensor, a clock, speedometer, a torque sensor, a throttle position sensor, a compass, a yaw rate sensor, a tilt sensor, a steering angle sensor, a brake sensor, and/or other sensors.

The signal diagram 200 may begin when the set of additional electronic devices 217 collects (222) or accumulates telematics data during operation of the respective set of vehicles. In embodiments, sensors incorporated in the set of additional electronic devices 217 and/or sensors external from the set of additional electronic devices 217 may collect the telematics data. The additional electronic devices 217 may transmit (224) the telematics data to the server 215, either in real-time or near-real-time as the telematics data is collected, at periodic intervals, or in response to a request from the server 215. After receiving the telematics data, the server 215 may store (226) the telematics data in memory. In embodiments, the server 215 may organize the telematics data according to certain parameters and metrics included in the telematics data, and/or correlated with specific locations. For example, the server 215 may organize speed data, braking data, and acceleration data for a certain stretch of roadway. The server 215 may also store characteristics associated with the set of vehicles, including make, model, year, and/or the like.

At a certain point, the electronic device 210 may optionally request (228) telematics data from the sensor(s) 220. According to embodiments, the electronic device 210 may automatically request the telematics data periodically (e.g., once every ten seconds, once every minute, once every hour), or a user of the electronic device 210 may cause the electronic device 210 to request the telematics data. The sensor(s) 210 may collect (230) or accumulate telematics data during operation of the vehicle, where the telematics data may be associated with operation of the vehicle associated with the sensor(s) 220. It should be appreciated that the sensor(s) 220 may collect the telematics data prior to, concurrent with, or subsequent to the additional electronic device(s) 217 collecting the telematics data.

The sensor(s) 220 may send (232) the telematics data to the electronic device 210, either in real-time or near-real-time as the telematics data is collected, at periodic intervals, or in response to a request from the electronic device 210. In embodiments, the telematics data may include at least a location (e.g., GPS coordinates). After receiving the telematics data, the electronic device 210 may examine (234) the telematics data. In particular, the electronic device 210 may identify certain metrics or parameters that may be included in the telematics data, and may organize or partition the telematics data according to the metrics or parameters. For example, the electronic device 210 may identify location data, speed data, acceleration data, operation mode (e.g., manual or autonomous), braking data, turning data, and/or similar data. Additionally, the electronic device 210 may identify characteristics of the vehicle, such as make, model, year, and/or the like.

The electronic device 210 may retrieve (236) additional telematics data and optionally location data from the server 215, where the additional telematics data may be at least a portion of the telematics data that the server 215 stored in (226). In particular, the electronic device 210 may send, to the server 215, the location data included in the telematics data received in (232). Further, the electronic device 210 may request a specific parameter or metric associated with the additional telematics data, and may specify a time range. For example, the electronic device 210 may request the last fifteen (15) minutes of speed data associated with a particular location. The server 215 may transmit, to the electronic device 210, the additional telematics data according to the request from the electronic device 210. In embodiments, the additional telematics data may correspond to vehicles having certain characteristics. For example, the server 215 may request additional telematics data corresponding to SUVs.

The retrieved data may also include location data associated with the location provided by the electronic device 210. For example, the location data may include construction information, traffic information, weather information, public safety information, roadway information or regulations (e.g., speed limit), and/or the like. In embodiments, the location data may represent real-time or near-real-time data, and the server 215 may access or retrieve the location data in real-time or near-real-time from a variety of sources including a set of additional servers.

The electronic device 210 may analyze (238) the telematics data received in (232), and the additional telematics data and/or location data retrieved in (236). In particular, the electronic device 210 may compare a portion(s) of the telematics data to a corresponding portion(s) of the additional telematics data. For example, the electronic device 210 may compare braking and acceleration data included in the telematics data to braking and acceleration data included in the additional telematics data. The electronic device 210 may also consider or analyze the location data, and in particular how certain portions of the location data relate to the telematics data and the additional telematics data. For example, the electronic device 210 may determine speed data included in the telematics data, average speed data included in the additional telematics data, and speed limit data included in the location data.

The electronic device 210 may calculate (240) a set of deviations associated with the data analysis of (238). In embodiments, the electronic device 210 may calculate a degree to which the parameters or metrics included in the telematics data differ from those included in the additional telematics data and/or from those included in the location data. For example, the electronic device 210 may determine that the vehicle associated with the sensor(s) 220 is braking 30% more than the average amount of braking as indicated in the additional telematics data. It should be appreciated that the electronic device 210 may calculate the set of deviations according to various techniques, calculations, algorithms, and/or the like.

The electronic device 210 may transmit (242) analysis data to the server 215, and the server may store (244) the analysis data. In particular, the analysis data may be representative of the analyses and calculations performed by the electronic device 210. Accordingly, the electronic device 210 and/or another electronic device may subsequently access the analysis data from the server 215 for review and/or further analysis.

The electronic device 210 may also generate (246) a visualization according to the analysis of (238) and/or the calculation of (240). Generally, the visualization may include data representative of a visual representation of certain data or information. It should be appreciated that different types and varieties of visualizations are appreciated. For example, the visualization may include charts, graphs, raw or compiled metrics, and/or the like. Further, the visualization may highlight various aspects of the telematics data in comparison to corresponding aspects of the additional telematics data. For example, the visualization may highlight a speed included in the telematics data to speed(s) included in the additional telematics data. Additionally, the visualization may alternatively or additionally incorporate certain aspects of the location data retrieved in (236). For example, the visualization may indicate that frequent accelerations are associated with a unique stretch of roadway such as an on-ramp. According to embodiments, the electronic device may generate the visualization in real-time or near-real-time in association with the examining of (234), the retrieving of (236), the analyzing of (238), and the calculating of (240).

After generating the visualization, the electronic device 210 may display (248) the visualization, such as via a user interface. In this regard, a user of the electronic device 210 may access and review the information included in the visualization. According to embodiments, the electronic device may display the visualization in real-time or near-real-time in association with the examining of (234), the retrieving of (236), the analyzing of (238), the calculating of (240), and the generating of (246). In this regard, the user is able to assess, in real-time or near-real-time, how to modify vehicle operation to decrease risk and/or improve safety.

Figure 3B:
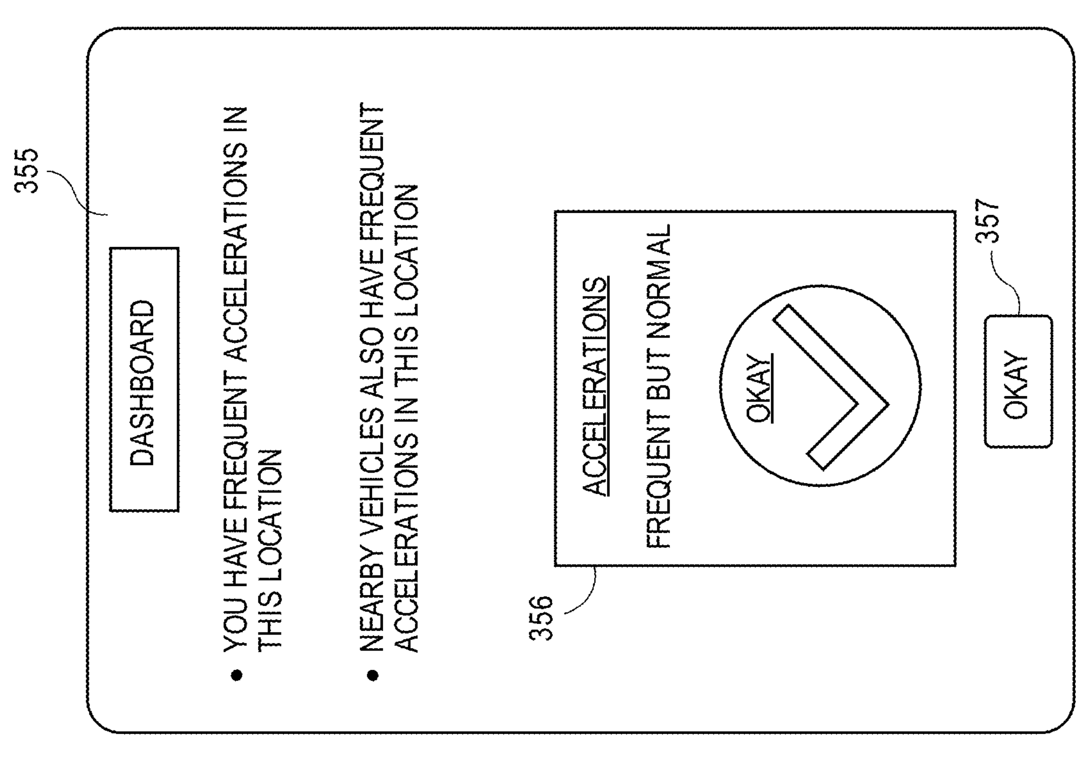
FIGS. 3A and 3B depict user interfaces associated with example notifications and visualizations, in accordance with some embodiments.
Figure 3A:
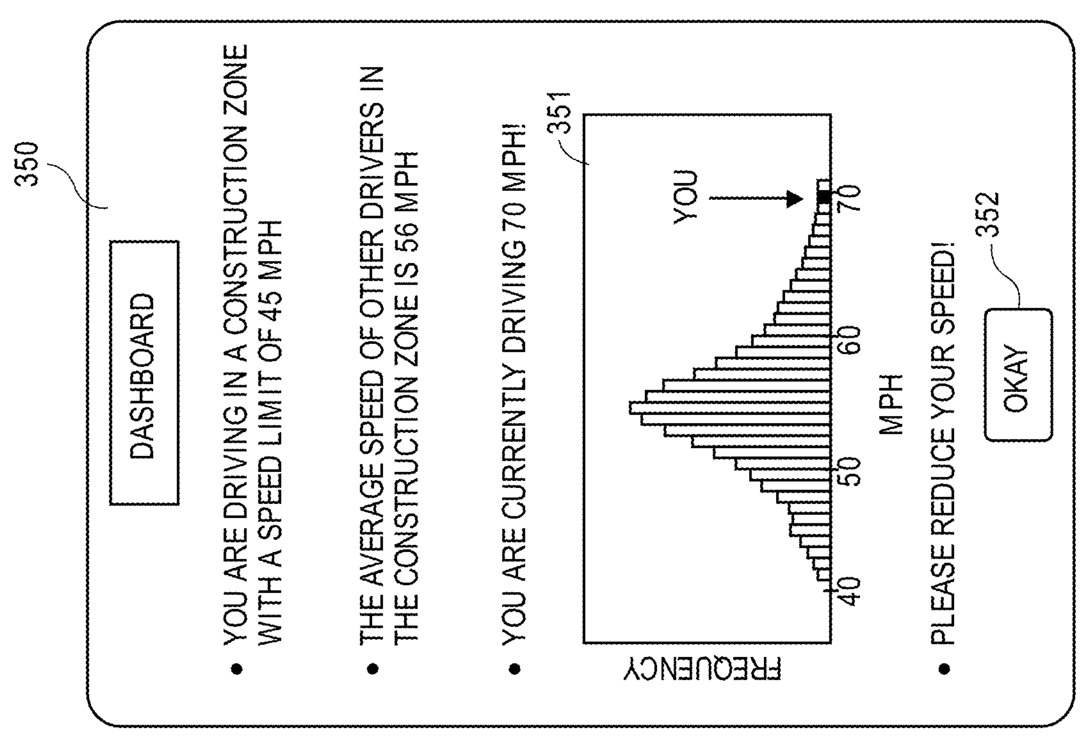

FIGS. 3A and 3B illustrate interfaces including example dashboards or notices. An electronic device (e.g., a mobile device, such as a smartphone) may be configured to display the interfaces and/or receive selections and inputs via the interfaces, where the electronic device may be associated with an individual traveling in a vehicle, or may be integrated into the vehicle. For example, a dedicated application that is configured to operate on the electronic device may display the interfaces. It should be appreciated that the interfaces are merely examples and that alternative or additional content is envisioned.

FIG. 3A illustrates an interface 350 including a visualization organized as a "dashboard." The interface 350 indicates information associated with the location of the vehicle ("You are driving in a construction zone with a speed limit of 45 mph"), information associated with operation of additional vehicles ("The average speed of other drivers in the construction zone is 56 mph"), and information associated with operation of the vehicle ("You are currently driving 70 mph!").

The interface 350 further includes a chart 351 that indicates the operation of the vehicle relative to operation of the additional vehicles in or near the construction zone. In particular, the chart 351 includes a "bell curve" indicating the operation of the vehicle (namely, that the vehicle is traveling faster than most other vehicles). The interface 351 further encourages the individual to reduce the vehicle speed ("Please reduce your speed!"). The interface 350 additionally includes an "okay" selection 352 that, when selected, may cause the electronic device to dismiss the interface 350.

FIG. 3B illustrates an interface 355 including a visualization organized as another "dashboard." The interface 355 indicates information associated with operation of the vehicle ("You have frequent accelerations in this location"), and information associated with operation of additional vehicles ("Nearby vehicles also have frequent accelerations in this location"). The interface further includes a graphic 356 indicating that the accelerations by the vehicle are "frequent but normal" and therefore the operation of the vehicle is "okay." The interface 355 additionally includes an "okay" selection 357 that, when selected, may cause the electronic device to dismiss the interface 355.

Figure 4:
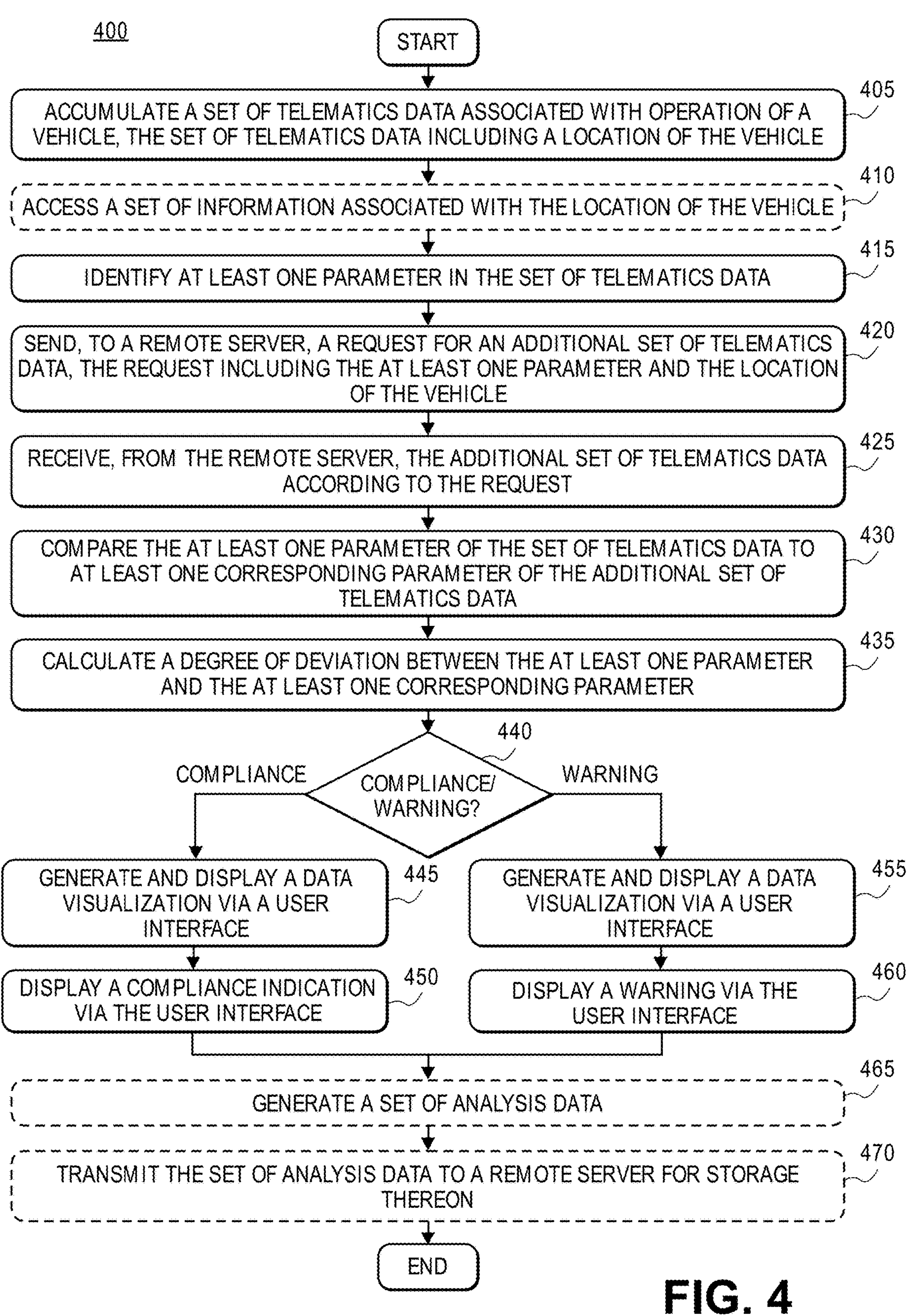
FIG. 4 depicts an exemplary flow diagram associated with dynamically assessing vehicle operation, in accordance with some embodiments.

FIG. 4 depicts is a block diagram of an exemplary method 400 of dynamically assessing vehicle operation. The method 400 may be facilitated by an electronic device such as the electronic device 210 as discussed with respect to FIG. 2. The electronic device may support execution of a dedicated application that may facilitate the functionalities of the method 400. Further, the electronic device may enable the user to make various selections and facilitate various functionalities.

The method 400 may begin when the electronic device accumulates (block 405) a set of telematics data associated with operation of a vehicle, where the set of telematics data may include a location of the vehicle. In embodiments, the electronic device may accumulate the set of telematics data from a combination of internal and external sensor(s). The electronic device may optionally access (block 410) a set of information associated with the location of the vehicle. In particular, the electronic device may locally access the set of information or may retrieve the set of information from a remote server, where the set of information may indicate rules or regulations associated with the location of the vehicle.

The electronic device may identify (block 415) at least one parameter included in the set of telematics data. In embodiments, the at least one parameter may be associated with an aspect of vehicle operation such as, for example, speed, braking, acceleration, turning, and/or the like. The electronic device may send (block 420), to a remote server, a request for an additional set of telematics data, where the request may include the at least one parameter and the location of the vehicle.

The electronic device may receive (block 425), from the remote server, the additional set of telematics data according to the request. In embodiments, the additional set of telematics data may be associated with the operation of an additional set of vehicles at or near the location of the vehicle, where the additional set of telematics data may be real-time or near-real-time, or previously captured. Further, in embodiments, the additional set of telematics data may include data according to the at least one parameter (e.g., if the electronic device requests speed data, then the additional set of telematics data may include speed data of the additional set of vehicles).

The electronic device may compare (block 430) the at least one parameter of the set of telematics data to at least one corresponding parameter of the additional set of telematics data. In comparing the data, the electronic device may account for the set of information associated with the location of the vehicle, as well as the time(s) that the set of telematics data and the additional set of telematics data was recorded. The electronic device may calculate (block 435) a degree of deviation between the at least one parameter and the at least one corresponding parameter. In calculating the degree of deviation, the electronic device may calculate a percent or absolute difference between the parameters, a percentile for the data, and/or other metrics.

Based on the degree of deviation, the electronic device may determine (block 440) whether the vehicle is in relative compliance (or otherwise "normal" operation) or whether to issue a warning. In embodiments, the electronic device may compare the degree of deviation to a threshold (e.g., number, percentage, or the like), and may deem that the vehicle is in relative compliance if the degree of deviation does not at least meet the threshold value, or determine to issue a warning if the degree of deviation at least meets the threshold value.

If the electronic device determines that the vehicle is in relative compliance ("COMPLIANCE"), the electronic device may generate (block 445) and display a data visualization via a user interface. In particular, the data visualization may indicate at least one of: the at least one parameter, the at least one corresponding parameter, the degree of deviation, and the set of information associated with the location of the vehicle, where the data visualization may be various formats, charts, and/or the like. Further, the electronic device may display (block 450) a compliance indication via the user interface. In embodiments, the compliance indication may be a visual indication or graphic indicating that the vehicle operation is "normal" or does not otherwise warrant a warning.

If the electronic device determines to issue a warning ("WARNING"), the electronic device may generate (block 455) and display a data visualization via a user interface. In particular, the data visualization may indicate at least one of: the at least one parameter, the at least one corresponding parameter, the degree of deviation, and the set of information associated with the location of the vehicle, where the data visualization may be various formats, charts, and/or the like. Further, the electronic device may display (block 460) a warning via the user interface. In embodiments, the warning may be a visual indication or graphic indicating certain details associated with the at least one parameter, and/or suggestions for modifying the vehicle operation.

In an optional implementation, the electronic device may generate (block 465) a set of analysis data based on the functionality of any of blocks 430, 435, 445, 450, 455, and 460. Further the electronic device may optionally transmit (block 470) the set of analysis data to a remote server for storage thereon.

Figure 5:
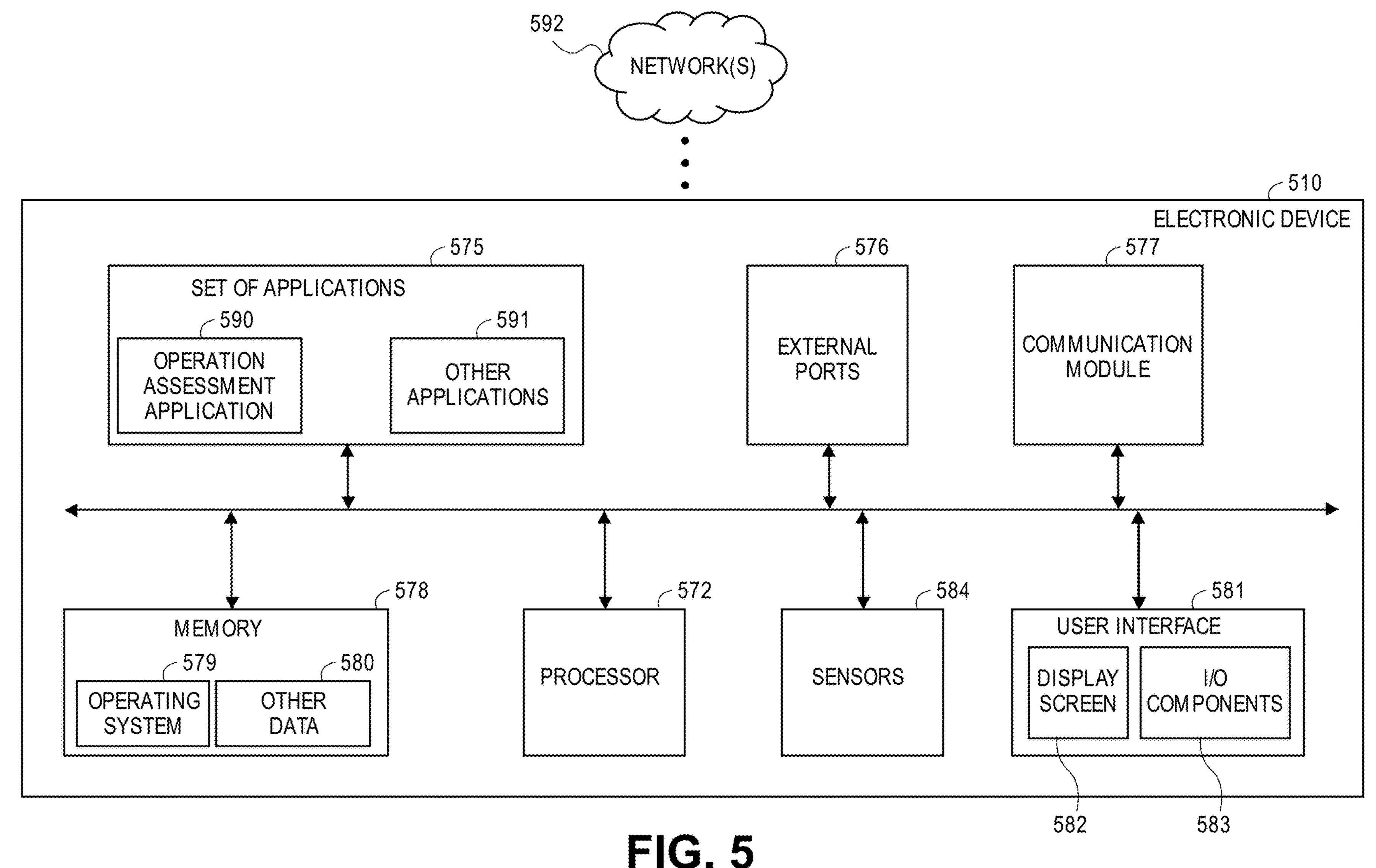
FIG. 5 is a block diagram of an exemplary electronic device, in accordance with some embodiments.

FIG. 5 illustrates a diagram of an exemplary electronic device 510 (such as the electronic device 210 as discussed with respect to FIG. 2) in which the functionalities as discussed herein may be implemented. It should be appreciated that the electronic device 510 may be configured to connect to an on-board telematics platform of a vehicle or another device associated with the vehicle, as discussed herein.

The electronic device 510 may include a processor 572 as well as a memory 578. The memory 578 may store an operating system 579 capable of facilitating the functionalities as discussed herein as well as a set of applications 575 (i.e., machine readable instructions). For example, one of the set of applications 575 may be an operation assessment application 590 configured to analyze vehicle telematics data from multiple sources. It should be appreciated that one or more other applications 591 are envisioned.

The processor 572 may interface with the memory 578 to execute the operating system 579 and the set of applications 575. According to some embodiments, the memory 578 may also include other data 580, such as various types or portions of telematics data. The memory 578 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The electronic device 510 may further include a communication module 577 configured to communicate data via one or more networks 592. According to some embodiments, the communication module 577 may include one or more transceivers (e.g., WWAN, WLAN, and/or WPAN transceivers) functioning in accordance with IEEE standards, 3GPP standards, or other standards, and configured to receive and transmit data via one or more external ports 576. Further, the communication module 577 may include a short-range network component (e.g., an RFID reader) configured for short-range network communications. For example, the communication module 577 may receive, via the network 592, telematics data associated with additional vehicles and/or information associated with a location of a vehicle.

The electronic device 510 may further include a set of sensors 584. The processor 572 and the set of applications 575 may interface with the set of sensors 584 to retrieve and process the corresponding sensor data. The set of sensors 584 may include, for example, a location module, an accelerometer, a gyrosensor, a force sensor, a strain gauge, an inclinometer, a goniometer, an image sensor, an ignition sensor, a clock, speedometer, a torque sensor, a throttle position sensor, a compass, a yaw rate sensor, a tilt sensor, a steering angle sensor, a brake sensor, and/or other sensors. In one particular implementation, the operation assessment application 590 may use various data from the set of sensors 584 to perform certain analyses and facilitate certain functionalities.

The electronic device 510 may further include a user interface 581 configured to present information to a user and/or receive inputs from the user. As shown in FIG. 5, the user interface 581 may include a display screen 582 and I/O components 583 (e.g., ports, capacitive or resistive touch sensitive input panels, keys, buttons, lights, LEDs, speakers, microphones). According to some embodiments, the user may access the electronic device 510 via the user interface 581 to review information and/or perform other functions. In some embodiments, the electronic device 510 may perform the functionalities as discussed herein as part of a "cloud" network or may otherwise communicate with other hardware or software components within the cloud to send, retrieve, or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processor 572 (e.g., working in connection with the operating system 579) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML). In some embodiments, the computer program product may be part of a cloud network of resources.

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "May include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

What is claimed:

1. A computer-implemented method for assessing vehicle operation, the method comprising:

retrieving, by an electronic device, location data for a vehicle and one or more other vehicles, wherein the location data is associated with real-time data for a location associated with the location data;

comparing, by the electronic device, parameters comprising at least one parameter of a set of telematics data associated with the vehicle and at least one additional parameter of an additional set of telematics data associated with the one or more other vehicles (a) within a threshold distance of the vehicle, and (b) of a same body type as the vehicle, to determine a degree of deviation between the parameters, wherein the comparing uses the location data associated with the real-time data; and transmitting for displaying, on the electronic device via a visual dashboard on an interactive user interface:

the degree of deviation between the parameters to an operator of the vehicle to provide feedback to the operator of the vehicle indicating whether the vehicle operation of the vehicle deviates from operations of the one or more other vehicles based on the degree of deviation; and a warning comprising a suggestion for the operator of the vehicle to modify a driving operation of the vehicle based at least on the degree of deviation.

2. The computer-implemented method of claim 1, wherein the electronic device comprises a mobile device or a computer server.

3. The computer-implemented method of claim 1, wherein the degree of deviation comprises at least one of an absolute difference between the parameters or a percentage difference between the parameters.

4. The computer-implemented method of claim 1, wherein the real-time data further comprises public safety data or weather information.

5. The computer-implemented method of claim 1, wherein the at least one additional parameter of the additional set of telematics data is further associated with the one or more other vehicles in a same driving mode as the vehicle, wherein the same driving mode comprises one or more of a manual driving mode or an autonomous driving mode.

6. The computer-implemented method of claim 1 further comprising:

accumulating, using a combination of sensors of the electronic device, the set of telematics data associated with the vehicle and the additional set of telematics data associated with the one or more other vehicles, wherein the combination of sensors comprises internal sensors or external sensors.

7. A system comprising one or more processors and one or more non-transitory computer-readable media storing computing instructions that, when executed on the one or more processors, cause the one or more processors to perform operations comprising:

retrieving, by an electronic device, location data for a vehicle and one or more other vehicles, wherein the location data is associated with real-time data for a location associated with the location data;

comparing, by the electronic device, parameters comprising at least one parameter of a set of telematics data associated with the vehicle and at least one additional parameter of an additional set of telematics data associated with the one or more other vehicles (a) within a threshold distance of the vehicle, and (b) of a same body type as the vehicle, to determine a degree of deviation between the parameters, wherein the comparing uses the location data associated with the real-time data; and transmitting for displaying, on the electronic device via a visual dashboard on an interactive user interface:

the degree of deviation between the parameters to an operator of the vehicle to provide feedback to the operator of the vehicle indicating whether vehicle operation of the vehicle deviates from operations of the one or more other vehicles based on the degree of deviation; and a warning comprising a suggestion for the operator of the vehicle to modify a driving operation of the vehicle based at least on the degree of deviation.

8. The system of claim 7, wherein the electronic device comprises a mobile device or a computer server.

9. The system of claim 7, wherein the degree of deviation comprises at least one of an absolute difference between the parameters or a percentage difference between the parameters.

10. The system of claim 7, wherein the real-time data further comprises public safety data or weather information.

11. The system of claim 7, wherein the at least one additional parameter of the additional set of telematics data is further associated with the one or more other vehicles in a same driving mode as the vehicle, wherein the same driving mode comprises one or more of a manual driving mode or an autonomous driving mode.

12. The system of claim 7, wherein the operations further comprise:

accumulating, using a combination of sensors of the electronic device, the set of telematics data associated with the vehicle and the additional set of telematics data associated with the one or more other vehicles, wherein the combination of sensors comprises internal sensors or external sensors.

13. One or more non-transitory computer-readable media storing computing instructions that, when executed by one or more processors, cause the one or more processors to perform operations comprising:

retrieving, by an electronic device, location data for a vehicle and one or more other vehicles, wherein the location data is associated with real-time data for a location associated with the location data;

comparing, by the electronic device, parameters comprising at least one parameter of a set of telematics data associated with the vehicle and at least one additional parameter of an additional set of telematics data associated with the one or more other vehicles (a) within a threshold distance of the vehicle, and (b) of a same body type as the vehicle, to determine a degree of deviation between the parameters, wherein the comparing uses the location data associated with the real-time data; and transmitting for displaying, on the electronic device via a visual dashboard on an interactive user interface:

the degree of deviation between the parameters to an operator of the vehicle to provide feedback to the operator of the vehicle indicating whether vehicle operation of the vehicle deviates from operations of the one or more other vehicles based on the degree of deviation; and a warning comprising a suggestion for the operator of the vehicle to modify a driving operation of the vehicle based at least on the degree of deviation.

14. The one or more non-transitory computer-readable media of claim 13, wherein the electronic device comprises a mobile device or a computer server.

15. The one or more non-transitory computer-readable media of claim 13, wherein the degree of deviation comprises at least one of an absolute difference between the parameters or a percentage difference between the parameters.

16. The one or more non-transitory computer-readable media of claim 13, wherein the at least one additional parameter of the additional set of telematics data is further associated with the one or more other vehicles in a same driving mode as the vehicle, wherein the same driving mode comprises one or more of a manual driving mode or an autonomous driving mode.

17. The one or more non-transitory computer-readable media of claim 13, wherein the operations further comprise:

accumulating, using a combination of sensors of the electronic device, the set of telematics data associated with the vehicle and the additional set of telematics data associated with the one or more other vehicles, wherein the combination of sensors comprises internal sensors or external sensors, and wherein the real-time data further comprises public safety data or weather information.

18. The system of claim 7, wherein the at least one additional parameter of the additional set of telematics data is further associated with the one or more other vehicles in a drive mode that is the same as the vehicle, wherein the drive mode comprises manual driving mode and autonomous driving mode.

19. The system of claim 7, wherein data visualization via the visual dashboard of the interactive user interface comprises text, graphics, or selectable icons.

20. The one or more non-transitory computer-readable media of claim 13, wherein data visualization via the visual dashboard of the interactive user interface comprises text, graphics, or selectable icons.

* * * * *